US006347881B1

(12) United States Patent
Serizawa et al.

(10) Patent No.: US 6,347,881 B1
(45) Date of Patent: Feb. 19, 2002

(54) VEHICLE LAMP

(75) Inventors: Yukio Serizawa; Kenichi Kubota, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/686,116

(22) Filed: Oct. 11, 2000

(30) Foreign Application Priority Data

Oct. 12, 1999 (JP) ........................................ 11-289120

(51) Int. Cl.$^7$ ................................................ B60Q 1/00

(52) U.S. Cl. ...................... 362/546; 362/516; 362/310; 362/362

(58) Field of Search ................................ 362/516, 517, 362/518, 519, 546, 362, 310

(56) References Cited

U.S. PATENT DOCUMENTS 6,059,433 A 5/2000 Otaka et al. ................ 362/507
6,220,739 B1 * 4/2001 Harada et al. .......... 362/546 X

* cited by examiner

*Primary Examiner*—Stephen Husar
(74) *Attorney, Agent, or Firm*—Fish & Richardson P.C.

(57) ABSTRACT

A vehicle lamp having a lamp body, which includes a rear surface portion and peripheral side surface portions where these portions are formed integrally by resin molding, is provided with thin-walled portions along boundary portions where the rear surface portion and the peripheral side surface portions meet. The thin-walled portions is designed to have a thickness thinner than that of other portions. For a lamp body with substantial width and depth, the large upper and lower surface portions can be prevented from being deformed by forming the thin-walled portions.

15 Claims, 5 Drawing Sheets

VEHICLE LAMP

BACKGROUND OF THE INVENTION

1. Field of the Invention

The present invention relates to a vehicle lamp, having a lamp body formed by resin molding, and more particularly to a vehicle lamp in which the lamp body is prevented from deforming after the molding process.

2. Description of the Related Art

Resin molding can be used to form a lamp body of a vehicle lamp such as an automobile. For example, for a front turn signal lamp disposed in an opening provided in a front bumper of an automobile, a lamp body 1 with a flat, rectangular front view and a paraboloidal rear surface portion as shown in FIG. 4, is formed by resin molding. The inner surface of the body 1 is coated with aluminum to form a reflecting surface. In addition, a seal groove 14 is formed in a front opening 1*a* of the lamp body 1 along its peripheral edges, and a lens 2 is attached to the front opening 1*a* of the lamp body 1 by making use of the seal groove 14. Further, a bulb 4 is detachably mounted in a bulb mounting sleeve 15 provided on a rear surface portion 11 of the lamp body 1 by using a bulb socket 5. Since the arrangement of this lamp is such that the lamp body 1 is formed to have a flat, rectangular front view as described above, peripheral side surface portions including upper and lower surface portions 12 and left and right surface portions 13 of the lamp body 1 are formed with flat shapes that extend in the forward direction substantially vertically and in parallel from the rear surface portion 11, which has the shape of a paraboloid.

FIG. 6 is a vertical cross-sectional view of the conventional lamp of the foregoing type. It can be seen from the drawing that the upper and lower surface portions 12 of the lamp 1 are formed to be flat surfaces extending in the forward direction in parallel from the rear surface portion 11 having the shape of a paraboloid.

In the above-described lamp body 1, to satisfy the required mechanical strength, the thickness of the resin from the rear surface portion 11 to the upper and lower surface portions 12 and the left and right surface portions 13 is designed to be of a sufficient and uniform thickness. Resin molding of the lamp body 1 is carried out by using a resin mold that fabricates the designed thickness.

In the above-described conventional lamp body 1, the thickness of the resin from the rear surface portion 11 to the peripheral side surface portions 12 and 13 is designed to be uniform. However, since the rear surface portion 11 and the peripheral side surface portions 12 and 13 meet each other close to an orthogonal angle, the diagonal thickness t12 of a portion whose diagonal thickness between the two portions is made large. That is, the portion indicated by X in the enlarged view of FIG. 6, becomes larger than the thickness t11 of the other uniform portions. For this reason, when the molded lamp body 1 is cooled after resin molding using the mold, the cooling of the X portion with the large thickness is retarded compared to other portions. Because of the difference in the cooling rate, an internal stress occurs in the lamp body 1. This internal stress appears in the form of deformation at portions of the lamp body 1 where the mechanical strength is relatively weak. In the lamp body, such as shown in FIG. 4, which has a flat shape and has an extensive depth as described above, the upper and lower surface portions 12 have larger areas compared to the left and right surface portions 13. The strength of the portions 12 against bending is, therefore, relatively low. Hence, as shown by two-dotted dash lines in the drawing, the upper and lower surface portions 12 are deformed in the state of being inwardly curved. When such deformation occurs, the lens may be prevented from being mounted in the front opening 1*a* of the lamp body 1. In noticeable cases, the lamp may not be used as a product, so that its production yield declines. In addition, even if the lens 2 can be attached and the parts can be assembled as a lamp, it is difficult to completely eliminate the deformation of the upper and lower surface portions of the completed lamp. Therefore, the external appearance is impaired, which constitutes as a factor that deteriorates the quality of the lamp.

SUMMARY OF THE INVENTION

An object of the invention is to provide a vehicle lamp configured to prevent deformation of its lamp body after resin molding and to permit formation of the lamp body of high quality.

The vehicle lamp includes a lamp body, which has a rear surface portion with a required surface shape and peripheral side surface portions formed to extend in a forward direction from a periphery of the rear surface portion. The rear surface portion and the peripheral side surface portions are integrally formed by resin molding, and a lens is provided in a front opening of the lamp body. Thin-walled portions are provided in which the thickness of the peripheral side surface portions or both the peripheral side surface portions and the rear surface portion along boundary portions where the rear surface portion and the peripheral side surface portions meet is made smaller than that of other portions. In particular, in an embodiment of the lamp body having a flat shape from a front view and a shape with extensive depth, each of the thin-walled portions is preferably formed at the boundary portion between the rear surface portion and each of upper and lower surface portions forming the peripheral side surface portions.

In embodiments of the invention, the thin-walled portions are provided, in which the thickness of the peripheral side surface portions or both the peripheral side surface portions and the rear surface portion is decreased along the boundary portions where the rear surface portion and the peripheral side surface portions meet. Because of the thin-walled portion, when the resin is being cooled after resin molding, the cooling rate of the boundary portions can be prevented from being slower than the cooling rate of the other portions, and the generation of stress in the lamp body can be suppressed.

In particular, since regions in the peripheral side surface portions are made thin in the boundary portions to form the thin-walled portions, the generation of stress at the peripheral side surface portions can be suppressed to prevent their deformation. In addition, for a large lamp body having substantial width and depth, the deformation of the upper and lower surface portions with large areas can be prevented by forming the thin-walled portions at the boundary portions between the rear surface portion and the upper and lower surface portions.

DETAILED DESCRIPTION OF THE PREFERRED EMBODIMENTS

Figure 1:
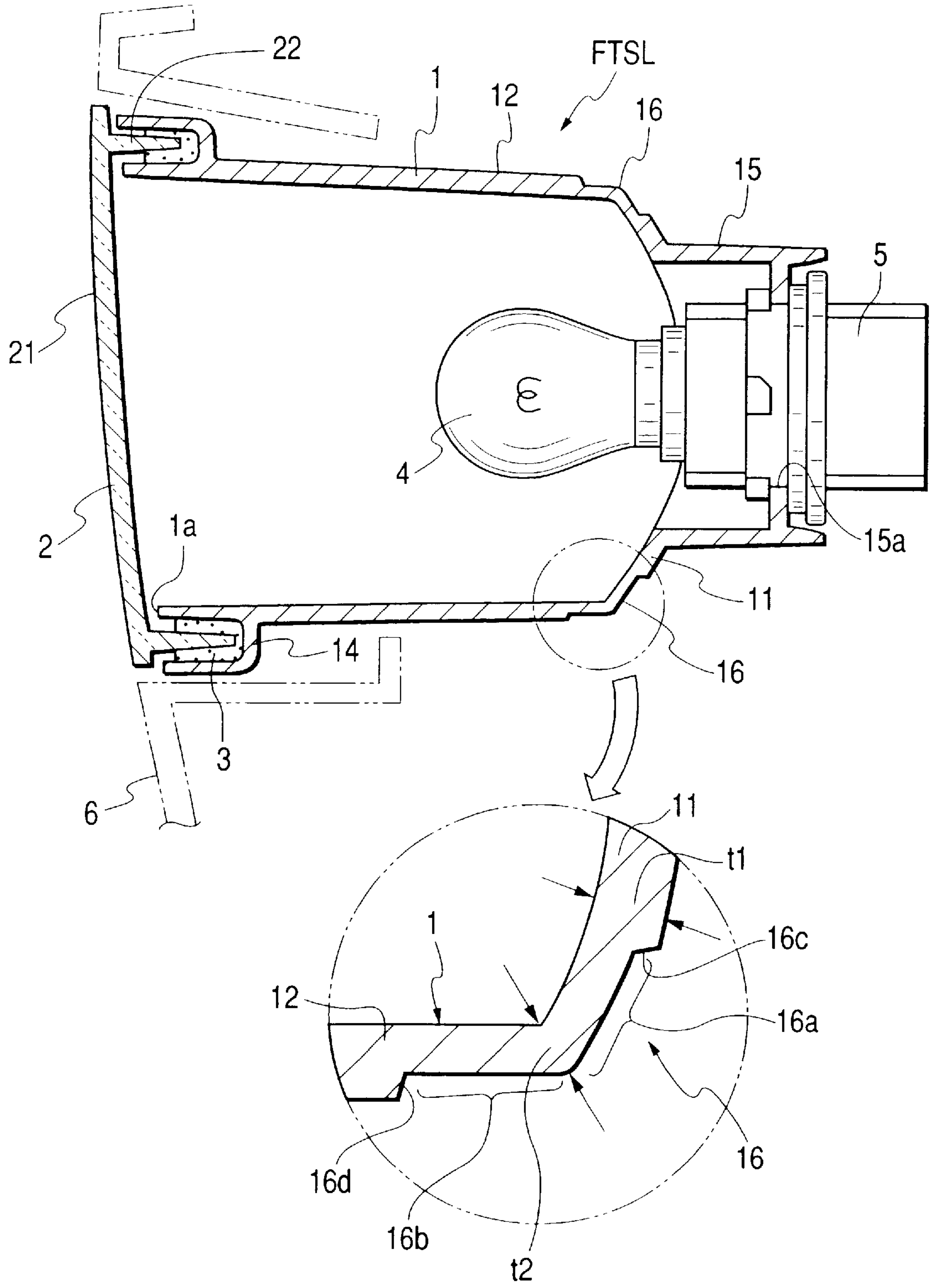
FIG. 1 is a cross-sectional view of an embodiment of a lamp in accordance with the invention and an enlarged view of its essential portion.
Figure 2:
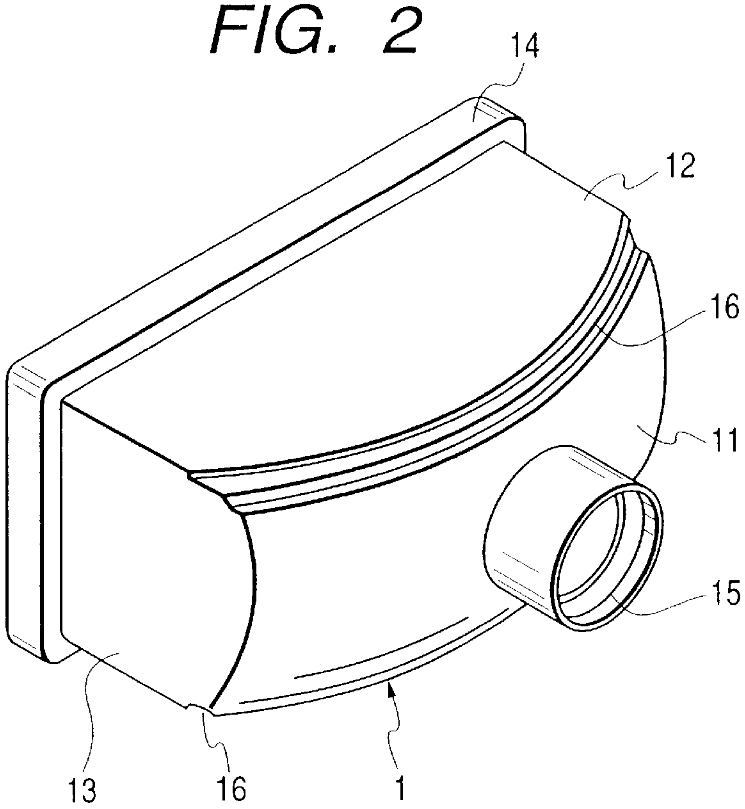
FIG. 2 is a perspective view of a lamp body of the lamp shown in FIG. 1.
Figure 4:
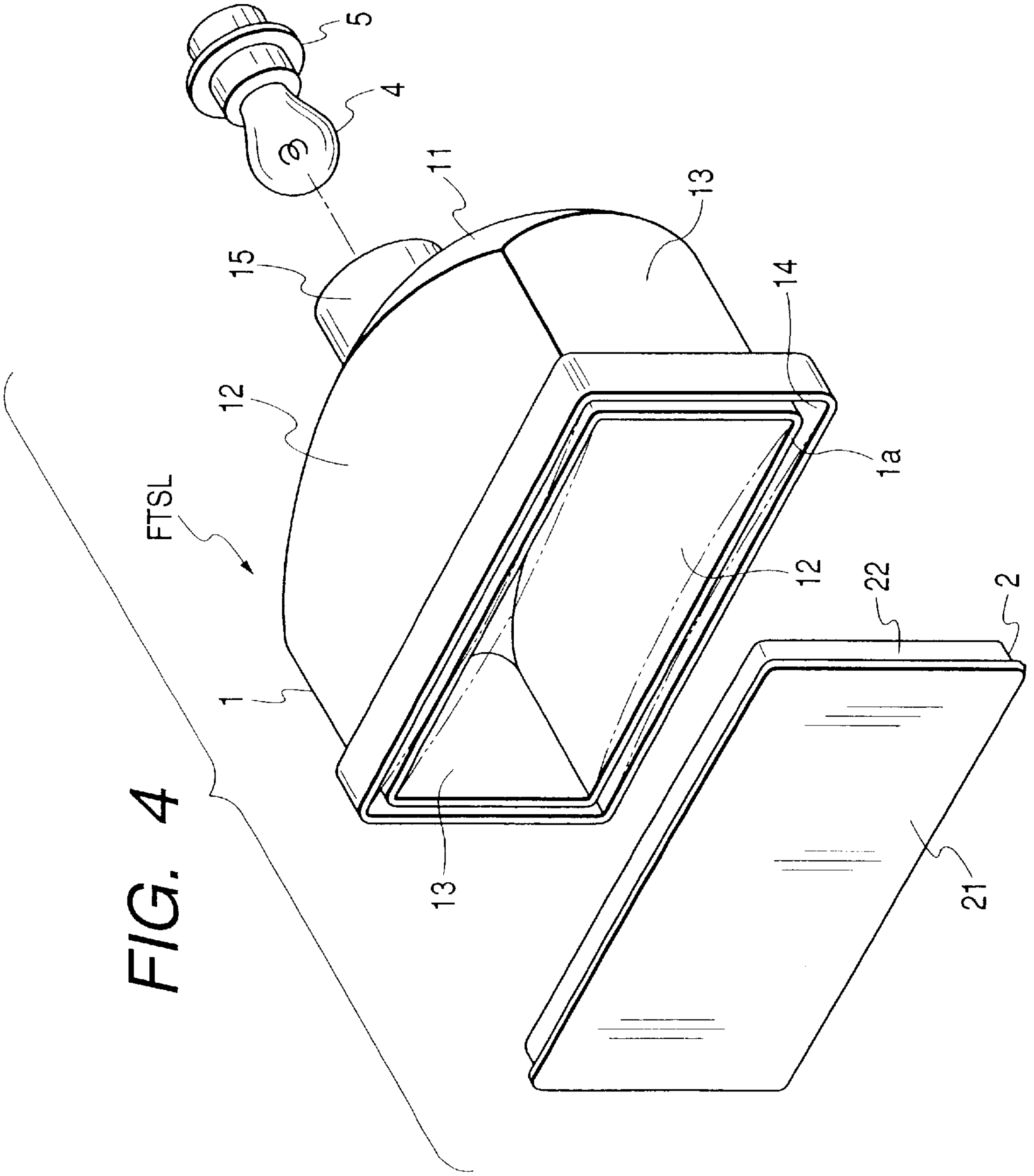
FIG. 4 is an exploded perspective view of a front turn signal lamp to which an embodiment of the invention is applied.

Referring now to the drawings, embodiments of the invention will be described. FIG. 1 is a vertical cross-sectional view of an embodiment of a lamp in accordance with the invention, and illustrates an example in which the embodiment of the invention is applied to a front turn signal lamp of a vehicle in the same way as the one shown in FIG. 4. In addition, FIG. 2 is a schematic perspective view, taken from the direction of the rear surface of a lamp body, of the lamp. Referring to FIGS. 1, 2, and 4, in the front turn signal lamp FTSL, a lamp body 1 whose front view is flat and rectangular and whose rear surface portion has a shape of a paraboloid is formed by resin molding. Namely, a portion of the paraboloid is cut in a slightly horizontally elongated rectangular shape and is formed as a rear surface portion 11, and peripheral side surface portions including upper and lower surface portions 12 and left and right surface portions 13 having flat shapes respectively extend in the forward direction vertically and in parallel from the respective upper and lower and left and right sides of the rear surface portion 11, thereby forming the lamp body 1. The inner surface of the lamp body 1 can be coated with aluminum and can be formed as a reflecting surface.

In addition, in a front opening 1*a* of the lamp body 1 formed by the peripheral side surface portions 12 and 13, a seal groove 14 having a U-shaped section is formed along its peripheral edges in an extending manner, and a lens 2 is attached to the front opening 1*a* of the lamp body 1 by making use of this seal groove 14. A seal leg portion 22 projects toward the rear surface portion along peripheral edges of the reverse surface of a lens surface 21 of the lens 2, and the seal leg portion 22 is fitted in the seal groove 14 and is secured by a sealant (bonding agent) filled in the seal groove 14. Further, a socket attaching sleeve 15 is formed on the rear surface portion 11 of the lamp body 1 to project toward the rear surface portion, a socket attaching hole 15*a* is formed in the bottom surface of the socket attaching sleeve 15, and a bulb socket 5 supporting a bulb 4 is detachably mounted in the socket mounting hole 15*a*. A portion 6 indicated by the two-dotted dash lines in FIG. 1 denotes a front bumper of the automobile, and the front turn signal lamp FTSL is mounted in an opening provided in the front bumper 6.

As shown in the enlarged view in FIG. 1, thin-walled portions 16 having their resin thickness formed to be thinner than the remaining portions are each provided in a boundary portion between the rear surface portion 11 and each of the peripheral side surface portions 12 and 13 of the lamp body 1. Particularly in this embodiment, the thin-walled portions 16 are provided in a boundary portion between each of the upper and lower surface portions 12, whose width and depth are large and whose relative area is larger than that of each of the left and right surface portions 13, and the rear surface portion 11 connected thereto. Specifically, the portions 16 are provided in at least a portion of each of the upper and lower surface portions 12 with the portion where the rear surface portion 11 and each of the upper and lower surface portions meet as a starting point. That is, in this embodiment, the portions 16 may be a belt-shaped portion having a slight width extending toward each of the upper and lower surface portions 12 and the rear surface portion 11.

To avoid surface irregularities on the inner surface of the lamp body 1, formed as a reflecting surface, the thin-walled portion 16 is formed by making the thickness of the relevant portion thin by recessing the outer surface side of the lamp body 1. For resin-molding the lamp body having the above-described thin-walled portion 16, a mold is designed and fabricated to have its cavity size of the boundary portion between the rear surface portion 11 and each of the upper and lower surface portions 12 decreased compared to the other portions.

By forming the thin-walled portion 16 by decreasing the thickness of the resin at a partial region of each surface portion including the boundary portion between the rear surface portion 11 and each of the upper and lower surface portions 12 in the above-described manner, the cooling rate of the resin-molded appliance body at the thin-walled portion 16 can be prevented from being retarded in reference to that of the other portions of the lamp body 1. Accordingly, a stress entailed by the difference in the cooling rate is prevented from occurring in at least the boundary portion between the rear surface portion 11 and each of the upper and lower surface portions 12. For this reason, the upper and lower surface portions 12, whose areas are large compared to the left and right surface portions 13, are prevented from becoming curved, that is, from becoming inwardly recessed because of the stress. Thus, it becomes possible to maintain the flat surface. Accordingly, the shape of the overall lamp body can be maintained, and the lens 2 can be properly attached to the front opening 1*a* of the lamp body 1. Further, the impairment of the external appearance of the lamp body 1 can be prevented, and a lamp of high quality can be obtained.

Figure 6:
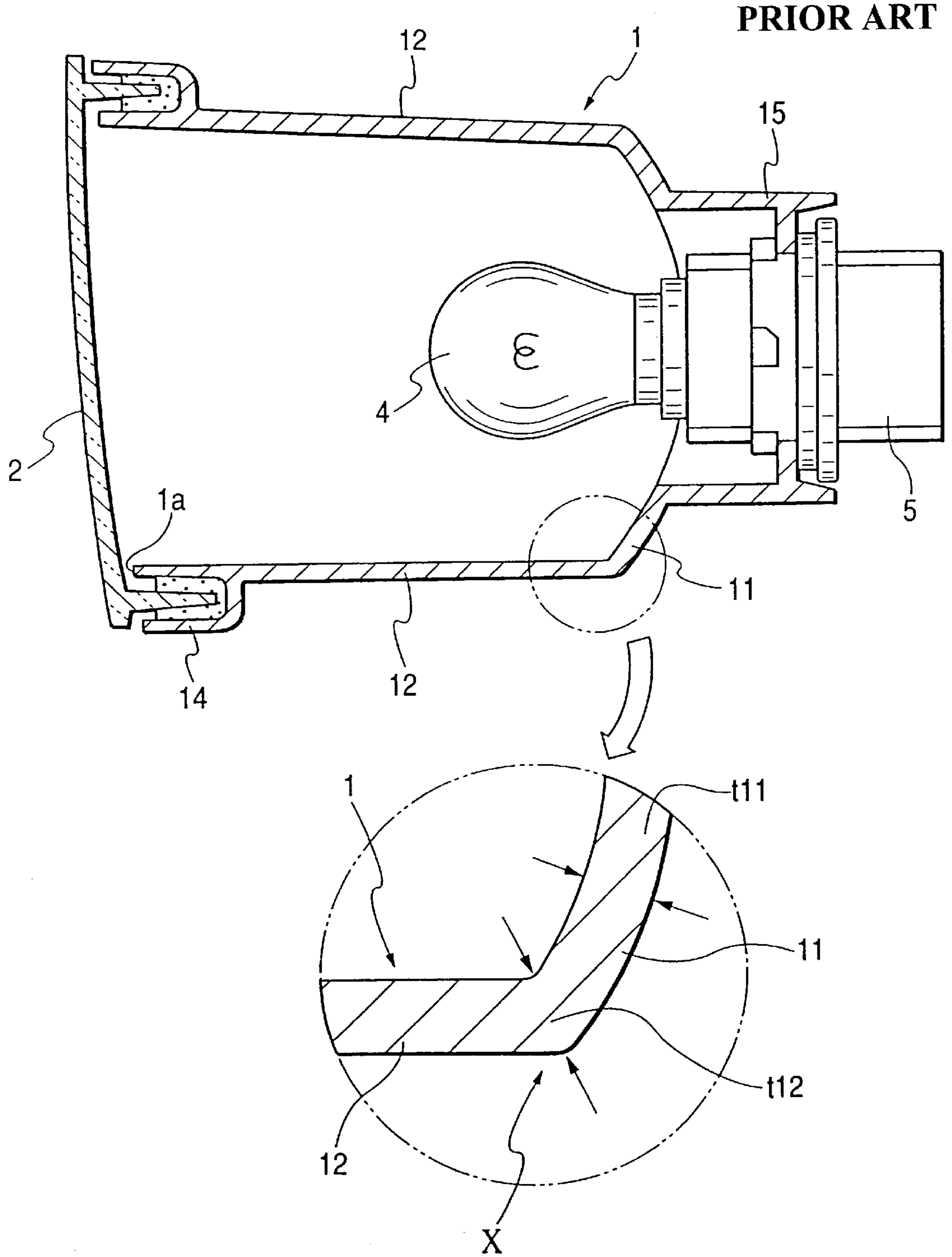
FIG. 6 PRIOR ART
FIG. 6 is a cross-sectional view of a conventional lamp and an enlarged view of its portion.

With respect to the thickness of the thin-walled portion 16 at the boundary portion between the rear surface portion 11 and each of the upper and lower surface portions 12, if the thickness of the rear surface portion 11 and the upper and lower surface portions 12 is made uniform as shown in the conventional construction in FIG. 6, the diagonal thickness t12 at the boundary portion between the two portions becomes larger than the thickness t11 of other uniform portions. In contrast, as shown in the enlarged view in FIG. 1, the thickness of the thin-walled portion 16 is designed such that the diagonal thickness t2 becomes equal or approximately equal to the thickness t1 of the other uniform portions. Further, in this case, if only the portion where the rear surface portion 11 and each of the upper and lower surface portions 12 meet is made locally thin, the relative thickness with respect to its adjoining portions changes sharply, so that, to the contrary, a concentration of stress may occur during resin cooling. Accordingly, as can be seen from the enlarged view in FIG. 1, the aforementioned stress concentration is prevented by providing regions 16*a* and 16*b* where the thickness is decreased over respective predetermined dimensional regions of the rear surface portion 11 and the upper and lower surface portions 12 including the portion where the rear surface portion 11 and the upper and lower surface portions 12 meet. In addition, boundary portions 16*c* and 16*d* between the thin-walled portion 16 and the portion that is not made thin are formed in a tapered shape so that the thickness changes gradually, thereby making it possible to prevent concentrating stress in the boundary portions 16*c* and 16*d*.

Figure 3:
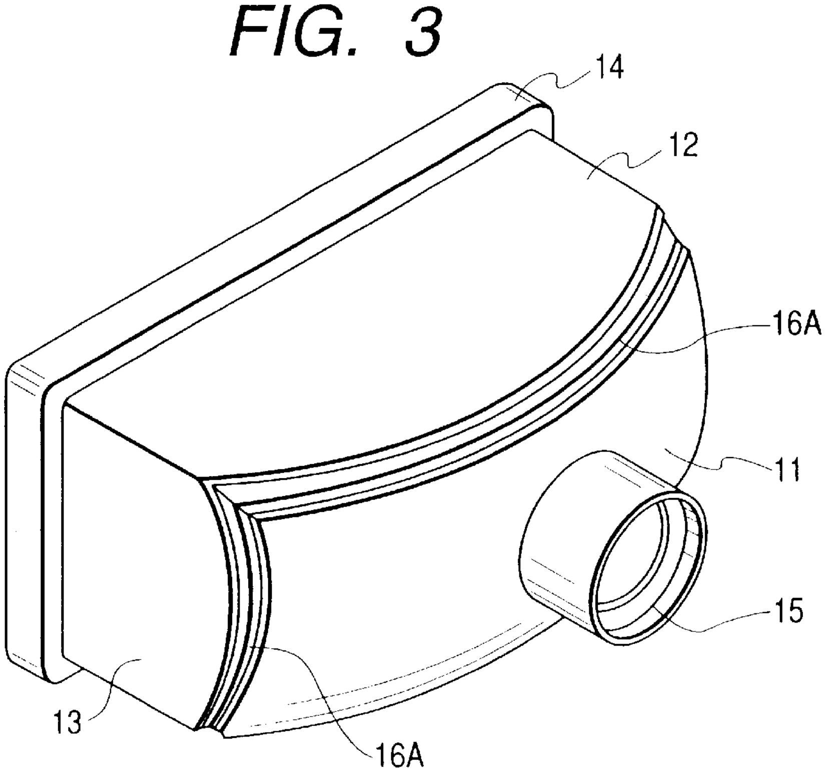
FIG. 3 is a perspective view of the lamp body in accordance with an embodiment of the invention.

Although, in the above-described embodiment, the thin-walled portions 16 are each provided in the boundary portion between the rear surface portion 11 and each of the upper and lower surface portions 12, thin-walled portions 16*a* may be formed over regions including the boundary portions between the rear surface portion 11 and the left and right surface portions 13, that is, over the boundary portions of all of the peripheral side surface portions, as shown in FIG. 3.

In the above-described embodiment, the thin-walled portion 16 is formed in a substantially equal dimension from the boundary portion between the rear surface portion 11 and each of the peripheral side surface portions 12 and 13 toward each of the rear surface portion 11 and the peripheral side surface portions 12 and 13. However, the dimensions of the two portions may be made different. For example, the dimension of the thin-walled portions at the peripheral side surface portions 12 and 13, which may be prone to curvature deformation, may be designed to be larger than that at the rear surface portion 11. Namely, if the thin-walled portions 16 having the required dimensions are formed in at least the peripheral side surface portions 12 and 13, the regions whose thickness is made thin may be arbitrarily formed in the rear surface portion 11.

Figure 5:
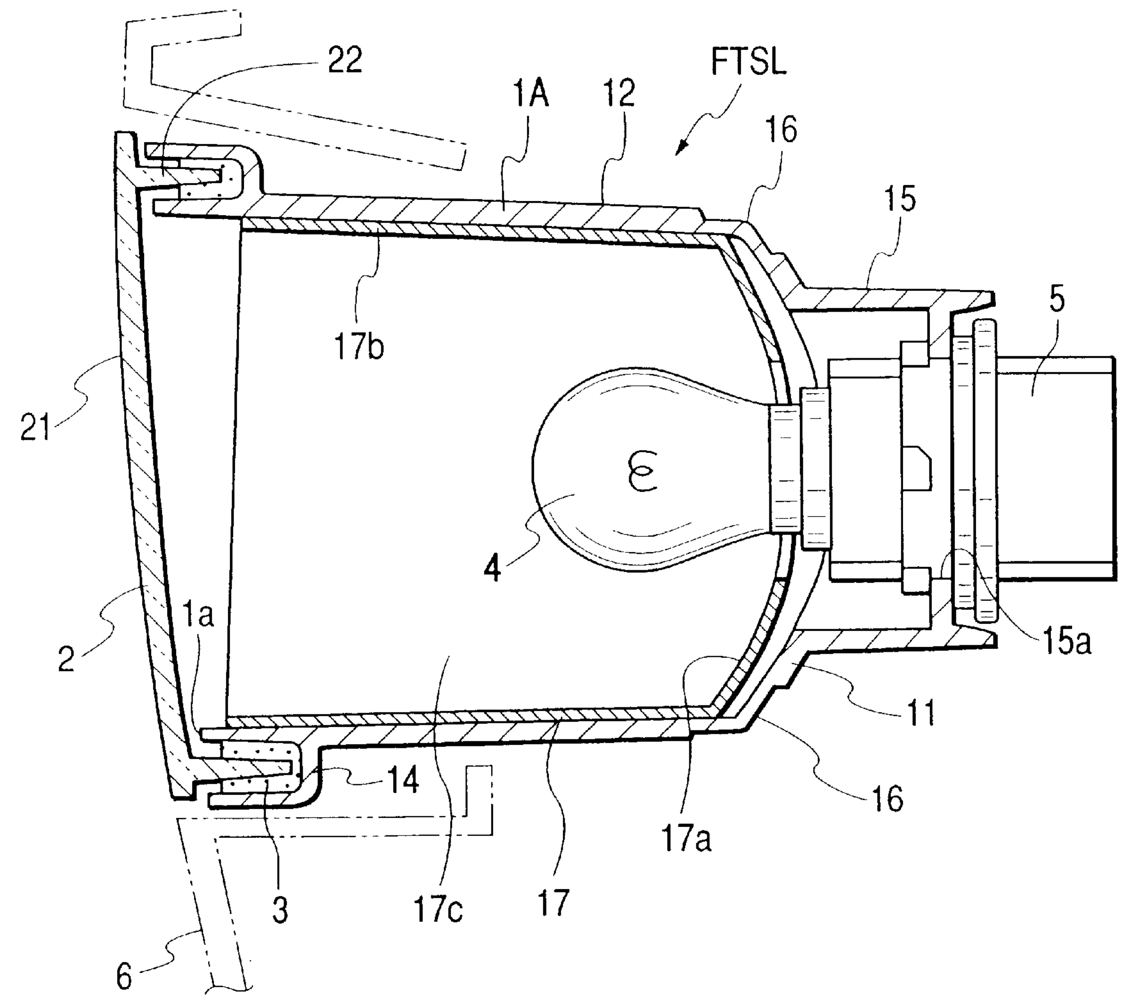
FIG. 5 is a cross-sectional view of a lamp in accordance with another embodiment of the invention.

Further, as shown in FIG. 5, an embodiment of the present invention may be applied to a lamp of the construction in which a reflector 17 provided as a separate unit is interiorly fitted in a lamp body 1A. In the drawing, portions corresponding to those of the above-described embodiment are denoted by the same reference numerals. The rear surface portion 11 of the lamp body 1A is not particularly formed so as to assume the shape of a reflecting surface, and is formed in an arbitrary planar shape required for the lamp body. In addition, in the same way as the above-described embodiment, the thin-walled portions 16 are formed by reducing the thickness of the resin in partial regions of the surface portions including the boundary portions between the rear surface portion 11 and the upper and lower surface portions 12 of the lamp body 1A, or the thickness of at least the peripheral side surface portions 12 and 13. Meanwhile, the reflector 17 is provided with a shape that allows the reflector 17 to be interiorly fitted in the lamp body 1A, and at least its rear surface region 17*a* is formed with a required shape of a reflecting surface. In addition, the reflector 17 may be formed of a metallic material, and its upper and lower surface portions 17*b* and left and right surface portions 17*c* extend along the respective inner surfaces of the upper and lower surface portions 12 and the left and right surface portions 13 of the lamp body 1A, and also have the function of preventing the thermal deformation of the peripheral side surface portions 12 and 13 of the lamp body 1A by insulating the heat generated by the bulb 4.

In this embodiment, by providing the thin-walled portions 16 in at least the peripheral side surface portions 12 or in the peripheral side surface portions 12 and the rear surface portion 11 along the boundary portion 11 and each of the upper and lower surface portions 12 of the lamp body 1A, the cooling rate of the resin-molded lamp body 1A at the thin-walled portion 16 can be prevented from being retarded compared to that of the other portions. Accordingly, the upper and lower surface portions 12 whose areas are large in comparison with the left and right surface portions 13 are prevented from becoming curved, particularly from becoming inwardly recessed because of the stress, and it becomes possible to retain the state of the flat surface.

Although, in the above-described embodiments, an example has been shown in which the invention is applied to the front turn signal lamp, the invention is equally applicable to lamps other than that of the embodiments insofar as they are lamps having lamp bodies which are formed by resin molding and have a structure in which their peripheral side surface portions are formed as flat surfaces.

As described above, in accordance with the embodiments of the invention, by providing the thin-walled portions in which the thickness of the peripheral side surface portions or both the peripheral side surface portions and the rear surface portion along the boundary portions where the rear surface portion and the peripheral side surface portions of the resin-molded lamp body meet is made smaller than that of the other portions, the cooling rate of the resin-molded lamp body at the boundary portions between the rear surface portion and the peripheral side surface portions can be prevented from becoming retarded compared to that of the other portions, and the generation of stress in the lamp body can be suppressed. Hence, it is possible to alleviate the stress in the peripheral side surface portions and prevent their deformation. In particular, for a lamp body having substantial width and deep, the deformation of the upper and lower surface portions with large surface areas can be prevented by forming the thin-walled portions at the boundary portions between the rear surface portion and the upper and lower surface portions. Thus, the production yield of the lamps and their quality can be improved.

Several embodiments of the invention have been described herein, but it should be understood that various additions and modifications could be made which fall within the scope of the following claims.

What is claimed is:

1. A vehicle lamp comprising:

a lamp body which has a rear surface portion with a required surface shape and peripheral side surface portions formed in such a manner as to extend in a forward direction from a periphery of said rear surface portion and in which said rear surface portion and said peripheral side surface portions are integrally formed by resin molding;

thin-walled portions in which the thickness of said peripheral side surface portions or both said peripheral side surface portions and said rear surface portion along boundary portions where said rear surface portion and said peripheral side surface portions meet is made smaller than that of other portions; and a lens provided in a front opening of said lamp body.

2. The vehicle lamp according to claim 1, wherein said lamp body has a flat shape from a front view and is formed to have a substantial depth.

3. The vehicle lamp according to claim 1, wherein said thin-walled portions are formed at the boundary portion between said rear surface portion and each of upper and lower surface portions forming said peripheral side surface portions.

4. A vehicle lamp comprising:

a lamp body which includes:

a rear surface portion;

peripheral side surface portions formed to extend in a forward direction from a periphery of said rear surface portion; and thin-walled portions along boundary portions where said rear surface portion and said peripheral side surface portions meet, the thickness of said thin-walled portions being thinner than that of portions adjacent to said thin-walled portions.

5. The vehicle lamp according to claim 4, wherein the peripheral side surface portions comprises an upper surface portion and a lower surface portion and a right surface portion and a left surface portion; and said upper and lower surface portions have a larger surface area than said left and right surface portions.

6. The vehicle lamp according to claim 5, wherein said thin-walled portions extend with a predetermined width toward each of said upper and lower surface portions.

7. The vehicle lamp according to claim 5, wherein said thin-walled portions extend with a predetermined width toward each of said upper and lower surface portions and said rear surface portion.

8. The vehicle lamp according to claim 5, wherein said thin-walled portions extend with a predetermined width toward each of said upper and lower surface portions, each of said left and right surface portions, and said rear surface portion.

9. The vehicle lamp according to claim 5, wherein the width of said thin-walled portions toward each of said peripheral side surface portions and the width of said thin-walled portions toward said rear surface portion are of different width.

10. The vehicle lamp according to claim 4, wherein the thickness at the boundary between the thin-walled portions and the adjacent portions is configured to change gradually.

11. The vehicle lamp according to claim 4, wherein said rear surface portion and said peripheral side surface portions are integrally formed by resin molding.

12. The vehicle lamp according to claim 4 further comprising:

a lens provided in a front opening of said lamp body.

13. The vehicle lamp according to claim 4 wherein the rear surface portion has a truncated paraboloidal shape to reflect light.

14. The vehicle lamp according to claim 4 further comprising:

a reflector interiorly fitted in the lamp body.

15. The vehicle lamp of claim 14, wherein the rear surface portion is of an arbitrary shape.

* * * * *